United States Patent [19]

Hazebrook

[11] Patent Number: 4,664,393
[45] Date of Patent: May 12, 1987

[54] SLIDING-SEGMENT BOOT FOR PLUNGING MECHANICAL JOINT

[75] Inventor: Daniel W. Hazebrook, Detroit, Mich.

[73] Assignee: GKN Automotive Components Inc., Southfield, Mich.

[21] Appl. No.: 702,149

[22] Filed: Feb. 15, 1985

[51] Int. Cl.⁴ .................. F16J 3/00; F16J 15/54
[52] U.S. Cl. ................... 277/174; 277/212 C; 464/133; 464/173
[58] Field of Search ................ 277/173–177, 277/212 R, 212 C, 212 F, 212 FB; 464/133, 173

[56] References Cited

U.S. PATENT DOCUMENTS

| | | | |
|---|---|---|---|
| 958,023 | 5/1910 | Spicer | 464/133 X |
| 1,051,025 | 1/1913 | Spicer | 464/133 X |
| 1,514,942 | 11/1924 | Whitten | 464/133 X |
| 1,747,529 | 2/1930 | Place | 464/133 X |
| 1,854,667 | 4/1932 | Ragan | 464/173 |
| 2,663,583 | 12/1953 | Bissell et al. | 277/174 |

*Primary Examiner*—Robert S. Ward
*Attorney, Agent, or Firm*—Remy J. VanOphem

[57] ABSTRACT

A sealing boot for sealing a power transmitting mechanical joint of the plunging type, especially a mechanical joint which is subject to angular articulation between its input member and output member. The mechanical joint has an outer member, and the outer member has an external cylindrical surface. The sealing boot has a semi-rigid or non-flexible segment which surrounds a portion of the cylindrical surface and this non-flexible segment has a cylindrical slot that sealingly and slidingly receives the cylindrical end portion of a second boot segment, which is also of semi-rigid or non-flexible character. The sliding action of the second boot segment in the first boot segment results from the plunging action of the joint. The second boot segment also has a slot at its other end and this slot slidingly and sealingly receives an end portion of a third boot segment. The third boot segment, in turn, seals to a member of the mechanical joint. The slot in the second boot segment is non-cylindrical, for example spherical, and the sliding action of the third boot segment in the slot of the second boot segment results from angular articulation of the joint. The invention is disclosed in the form of a boot for an automotive front wheel drive joint of the plunging type.

17 Claims, 2 Drawing Figures

SLIDING-SEGMENT BOOT FOR PLUNGING MECHANICAL JOINT

BACKGROUND OF THE INVENTION

1. Field of the Invention

The present invention relates to a boot or seal for a power transmitting mechanical joint of the plunging type, especially for a joint which is subject to articulation during operation. More particularly, this invention relates to a boot or seal of the aforesaid type in which at least a portion of such boot is of a non-flexible character. Specifically, this invention relates to a boot or seal for a constant velocity joint of the type used as the inboard drive joint in an arrangement for driving a front wheel of a front wheel drive automotive vehicle, in which the portion of the seal or boot which engages the outer race of the joint is of a semi-rigid character.

2. Description of the Prior Art

Plunging constant velocity drive joints are widely used in the automotive industry as means to transmit power from the transmission of a front wheel drive vehicle to the driven front wheels of the vehicle, with one of such joints being provided for each of the driven wheels. Typically, a plunging drive joint is used as the inboard or inside drive joint in an arrangement where another drive joint of the non-plunging joint is used as the outboard or outside drive joint, and all changes in the spacing between the transmission and the driven wheel are accommodated by the plunging action of the input and output members of the plunging joint with respect to one another. Each such drive joint must be sealed, of course, to maintain the necessary lubrication in place within the joint and to keep the joint free from contamination by dirt and other external contaminants.

In the case of mechanical joints of the plunging type, the devices heretofore used to accomplish this sealing function, which are usually referred to as seals or boots, have been of a flexible construction, usually constructed of an elastomeric material and usually in a pleated configuration. Such flexible construction, however derived, gives the boot the ability to distort to accommodate both articulation or angular movement of the normally axially aligned input and output members of the joint, an operation condition which can develop due to road vibration or cornering, for example, as well as lineal or axial movement between the input and output shafts, a condition which can occur even when the engine is idling due to the tilt of the engine which results therefrom, without breaking the seal of the joint during such articulation and/or lineal or axial movement.

Flexible boots or seals for plunging automotive constant velocity drive joints, as heretofore described, have been utilized quite extensively. However, these seals are quite expensive, and due to the fact that their dimensions readily change by virtue of their flexible nature, they must be installed using manual operations, which precludes the use of some cost-saving mechanical assembly techniques that rely on precise dimensions of the parts being installed. Additionally, these flexible boots or seals, which are made from elastomeric materials, are subject to puncture in use due to road hazards and other forms of concentrated impacts, and these materials are known to be subject to degradation of properties when exposed to low temperatures or high temperatures of the type that can be encountered during the normal life of an automobile. Additionally, due to the pleated configuration of these flexible boots or seals, the interior volume thereof is rather large and this volume, which must be filled with grease to properly lubricate the associated joint, requires a rather large volume of grease for that purpose. Furthermore, many elastomeric materials are subject to degradation when exposed to grease, and this grease sensitivity further limits the useful life of such flexible seals.

SUMMARY OF THE INVENTION

In accordance with the present invention there is provided a seal or boot for a plunging mechanical joint, such as a constant velocity inboard front wheel drive joint for an automotive vehicle. This boot is manufactured from a plurality of boot segments, at least a pair of which are manufactured from a non-flexible material, preferably a semi-rigid polymeric material, such as a thermosetting material, and the assembly expense of a joint having such a boot can be substantially reduced relative to the assembly expense of a prior art joint having a flexible boot by means of mechanical assembly techniques and without detracting from the performance features of the joint or its boot. Additionally, such a seal has improved properties relative to its prior art counterpart in that the semi-rigid portions thereof are more puncture resistant than an elastomeric seal, it is more tolerant of high and low temperatures, and it is less subject to degradation in contact with grease.

The first of the semi-rigid segments of the boot of the present invention surrounds the outer member of the joint in surface-to-surface sealing relationship therewith. This first segment has a right circular cylindrical or other cylindrical slot which faces the other member of the joint. One end of the second of the semi-rigid segments of the boot has a cylindrical configuration and this cylindrical end is slidingly and sealingly received in the cylindrical slot of the first segment. The other end of the second of the non-flexible segments has means extending therefrom, and such means sealingly engages the inner member of the mechanical joint in a manner which permits the shaft which is attached to the inner joint member to angularly articulate with respect to the outer member without breaking the seal of the joint. This arrangement will also permit the outer member of the joint and the inner member of the joint to move axially with respect to one another, or plunge, without loss of the seal provided by the boot by virtue of the ability of the cylindrical portion of the second of the non-flexible segments of the boot to sealingly slide back and forth within the cylindrical slot of the first of the semi-rigid segments of the boot.

In the preferred embodiment of the present invention, the means extending from the second of the semi-rigid segments of the boot is a separate segment, preferably also manufactured from a semi-rigid polymeric material. In this embodiment, the second of the semi-rigid boot segments is provided with a non-cylindrical slot at its end that faces the inner member of the joint, and the third of the semi-rigid boot segments has an end that is shaped to fit complementally and sealingly within such non-cylindrical slot in the second of the boot segments. The complemental relationship between the non-cylindrical slot in the second of the boot segments and the end of the third boot segments that is received therein permits the seal of the boot to be maintained as the axis of the inner member and the axis of the outer member are being angularly articulated with respect to one another.

Accordingly, it is an object of the present invention to provide an improved boot for sealing a mechanical power transmitting joint of the plunging type.

More particularly, it is an object of the present invention to provide an improved boot for sealing a plunging power transmitting mechanical joint whose input and output members are subject to articulation relative to one another.

More particularly, it is an object of the present invention to provide an improved boot for sealing a constant velocity drive joint of the plunging type.

More particularly, it is an object of the present invention to provide an improved boot for sealing a plunging constant velocity drive joint used to drive a front wheel of a front wheel drive automotive vehicle.

It is a further object of the present invention to provide a boot for sealing a plunging constant velocity drive joint of a front wheel drive automotive vehicle in which the boot has a pair of segments each of which is formed from a semi-rigid material, and in which a cylindrical end portion of one of the segments is slidingly and sealingly received in a cylindrical slot of the other of the segments in a way that permits plunging action between such segments.

It is also an object of the present invention to provide a power transmitting mechanical joint which is capable of articulation and plunging action and which is sealed by a multi-segment boot, at least a pair of the segments of the boot being manufactured from a semi-rigid polymeric material.

Other objects and advantages of this invention will become apparent from the following detailed description taken in conjunction with the accompanying drawings.

DETAILED DESCRIPTION OF THE PREFERRED EMBODIMENT

Figure 1:
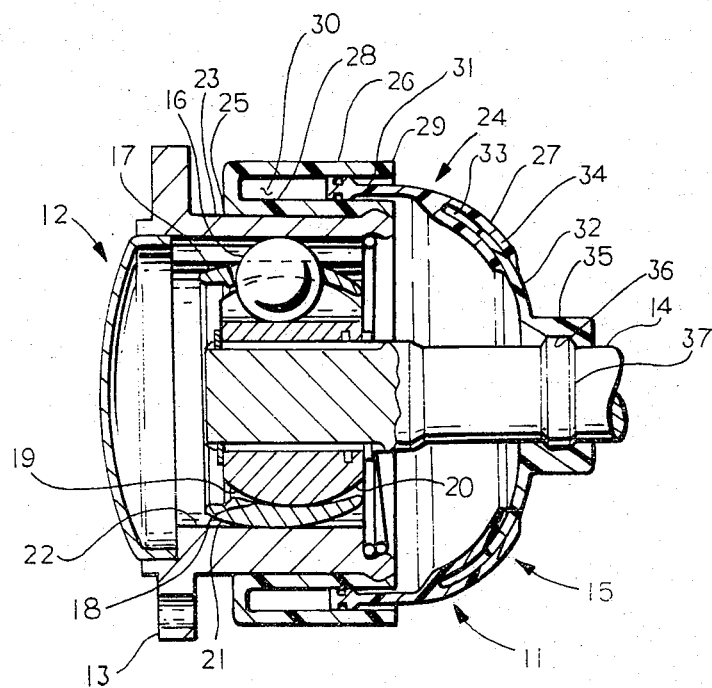
FIG. 1 is an elevational view, in section, of a plunging constant velocity drive joint having a preferred embodiment of a sealing boot according to the present invention.

FIG. 1 illustrates a constant velocity drive joint of the plunging type, indicated generally by reference character 11. The drive joint 11 is shown as being of the flange-mounted type, and receives power at an input end 12 through a peripheral flange 13 that is adapted to be connected to the transmission (not shown) of a vehicle, for example, an automobile, and transmits power to a driven member, not shown, by an output shaft 14 which extends from an output end 15 of the drive joint 11. It is, however, contemplated that the the invention can be utilized in conjunction with stem-mounted, c.v. drive joints as well as flange-mounted, drive joints of the type shown. As is known in the prior art, power is transmitted from the input end 12 to the output end 15 by means of a circumferential series of balls 16, typically six in number, which are contained in a bearing cage 17. The cage 17 has an inner spherical surface 18, and this engages the complemental outer spherical surface 19 of an inner joint member 20 so that the cage 17 not only centers the inner joint member 20 but is also longitudinally restrained thereby. The cage 17 also has a part-spherical outer surface portion 21 adjacent one end and this surface portion 21 engages a cylindrical bore 22 through an outer joint member 23.

In operation, the input end 12 and the output end 15 are subject to articulation or angular distortion from the normal axial orientation between these ends, which is depicted in FIG. 1. In the case of an inboard drive joint for driving a front wheel of a front wheel drive automobile, this articulation can be of the order of twenty (20°) in each direction and can result, for example, from normal road vibrations and bumps encountered by such a vehicle and from the cornering of the vehicle. Additionally, in a constant velocity universal joint of the plunging type, the drive joint 11 must be capable of accommodating a certain amount of axial movement of the input end 12 with respect to the output end 15.

The drive joint 11, as heretofore described, contains precision machined elements and these elements must be kept lubricated and free from contamination by dirt and other contaminants that may be encountered in an automotive environment. To this end the drive joint 11 is provided with a boot, indicated generally at 24, to seal the interior of the drive joint 11. Of course, the boot 24 must be capable of accommodating the degree of articulation and plunging that the drive joint 11 itself is subject to without loss of the sealing characteristics of the boot 24 during or as a result of such articulation, and in an automotive application it should be capable of doing so for many years.

As previously noted, the drive joint 11 must be capable of accommodating a substantial degree of angular articulation between the input end 12 and the output end 15. The axial or plunging movement portion of this requirement is provided in part by constructing the outer joint member 23 of the drive joint 11 with a cylindrical outer surface 25. The surface 25 may be in the form of a right circular cylinder, or it may be in the form of a non-circular cylinder, for example, a cylinder with the cross-section of a cloverleaf. Additionally, this plunging movement is provided by constructing the boot 24 in a plurality of individual boot segments including two boot segments, a first boot segment 26 and a second boot segment 27, each of which is constructed of a suitable semi-rigid or non-elastomeric polymeric material. The first boot segment 26 has an inner member 28 that is cylindrical in configuration, closely surrounding the cylindrical surface 25 of the outer joint member 23 in sealing engagement therewith. The first boot segment 26 also has an outer member 29 that surrounds the inner member 28 and defines a cylindrical slot 30 therewith. The second of the semi-rigid boot segments, segment 27, has a cylindrical end portion 31 that is slidingly and sealingly received in the slot 30 of the first boot segment 26 and is free to move axially to and fro within the slot 30 as the flange 13 moves axially to and fro with respect to the shaft 14.

The first boot segment 26 has means 32 extending therefrom to sealingly engage the shaft 14 to complete the seal of the drive joint 11 by the sealing boot 24. In the preferred embodiment, as depicted in FIG. 1, the means 32 is yet another semi-rigid boot segment, and in this embodiment the first boot segment 26 has a non-cylindrical sealing slot 33 incorporated therein, and this slot 33 slidingly and sealingly receives a complementally contoured non-cylindrical end portion 34 of the boot segment 32. During articulation of the flange 13 of the drive joint 11 with respect to the output shaft 14, the end portion 34 of the boot segment 32 moves up and down in the sealing slot 33 of the second boot segment 27 to maintain the sealed characteristics of the drive joint 11.

The completion of the seal between the boot segment 32 and the output shaft 14 is obtained by providing the boot segment 32 with a cylindrical portion 35 at its other end. The cylindrical portion 35 surrounds and engages a portion of the output shaft. The cylindrical portion 35 is provided with a circumferential recess 36 to receive a circumferential rib 37 on the output shaft 14 to provide for a tight snap-fit therebetween.

As previously noted, the boot segments 26, 27, and 32 are manufactured from semi-rigid non-elastomeric materials. Glass impregnated Nylon (polyamide) materials are suitable for these boot segments because these materials have good resistance to rupturing, good resistance to high and low temperatures, and good grease resistance. The boot 24, which is made up of the boot segments 26, 27, and 32 will also be self-lubricating because a portion of each of the segments has a surface which will be in contact with the lubricant in the joint, and due to the centrifugal forces on such lubricant during the operation of the drive joint there will be a fairly uniform application of the lubricant against the lubricant-exposed surface of each segment during the operation of the drive joint. Also, because the sealing boot 24 does not incorporate any pleated flexible portion, its interior volume will be reduced, and this will reduce the amount of lubricant which must be added to the drive joint. Also, because of the semi-rigid nature of the boot segments 26, 27, and 32, they will have rather precise dimensions and, as a consequence thereof, they are amenable to mechanical handling during assembly, a technique which has the potential of reducing assembly costs. Also, the boot 24 has the potential of being capable of assembly to the other elements of the drive joint 11 without the use of clamping bands or other retaining devices of the type that are used to assemble flexible boots to mechanical joints. This represents a further cost reduction in material and assembly costs.

While the use of a boot segment corresponding to the first boot segment 26 is preferred, it is contemplated that the invention may be practiced without the use of such a segment, so long as the outer surface of the outer joint member is cylindrical and the second boot segment corresponding to the boot segment 27 contains a cylindrical sealing portion that is capable of sliding to and fro on the cylindrical outer surface of the outer joint in a sealing manner. If this is done, preferably the cylindrical surface portion of the outer joint will be circular in cross-section, so that the cylindrical sealing portion of the boot segment will not be subject to distortion in shape as a result of the tension or hoop stress that will need to be developed therein to insure that it will maintain a good seal with respect to the outer surface of the outer joint member.

Figure 2:
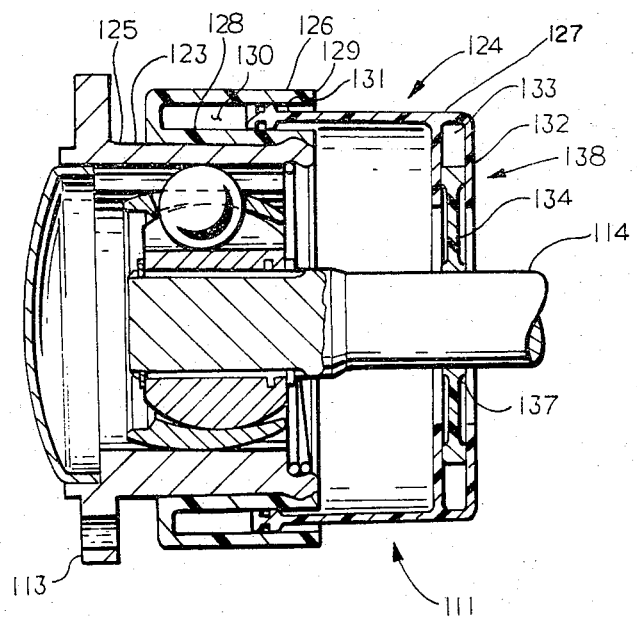
FIG. 2 is an elevational view, partially in section, of a plunging constant velocity drive joint having an alternative embodiment of a sealing boot according to the present invention.
Figure 2:
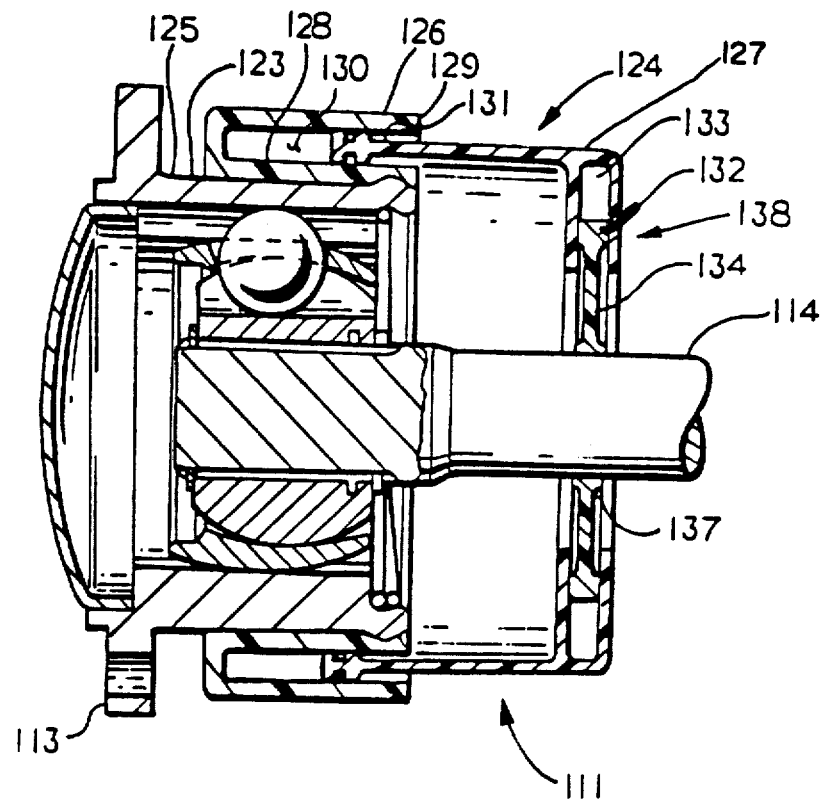

FIG. 2 illustrates an alternative embodiment of a constant velocity drive joint, indicated generally by reference character 111. The drive joint 111 may be considered to be generally similar in all respects to the drive joint 11 of the embodiment of FIG. 1 except that it is provided with an alternative embodiment of a plunging sealing boot indicated generally by reference character 124. Like the sealing boot 24 of the embodiment of FIG. 1, the sealing boot 124 must be capable of accommodating both axial and angular movement between an input member 113 and an output member 114 of the drive joint 111.

As required, axial or plunging movement is provided by the boot 124 in part by constructing the outer joint member 123 of the drive joint 111 with a cylindrical outer surface 125. The surface 125 may be in the form of a right circular cylinder, or it may be in the form of a noncircular cylinder, for example, a cylinder with the cross-section of a cloverleaf. Additionally, this plunging movement is provided by constructing the boot 124 in a plurality of individual boot segments including two boot segments, a first boot segment 126 and a second boot segment 127, each of which is constructed of a suitable semi-rigid or non-elastomeric polymeric material. The first boot segment 126 has an inner member 128 that is cylindrical in configuration, closely surrounding the cylindrical surface 125 of the outer race in sealing engagement therewith. The first boot segment 126 also has and an outer member 129 that surrounds the inner member 128 and defines a cylindrical slot 130 therewith. The second of the semi-rigid boot segments, segment 127, has a cylindrical end portion 131 that is slidingly and sealingly received in the slot 130 of the first boot segment 126 and is free to move axially to and fro within the slot 130 as the input member 113 moves axially to and fro with respect to the output member 114.

The first boot segment 126 has means 138 extending therefrom to sealingly engage the output member 114 to complete the seal of the drive joint 111 by the sealing boot 124. As depicted in FIG. 2, the means 138 is yet another semi-rigid boot segment, a third boot segment 132, and in this embodiment the first boot segment 126 has a radial sealing slot 133 incorporated therein, and this slot 133 slidingly and sealingly receives a radial end portion 134 of the third boot segment 132. During articulation of the input member 113 of the drive joint 111 with respect to the ouptut member 114, the end portion 134 of the third boot segment 132 moves up and down in the sealing slot 133 of the second boot segment 127 to maintain the sealing characteristics of the drive joint 111.

The completion of the seal between the third boot segment 132 and the output member 114 is obtained by the utilization of a soft sealing compound in the form of an annular bead 137 to seal the juncture between the inner periphery of the third boot segment 132 and the output member 114. As in the case of the first, second, and third boot segments 26, 27, and 32, respectively, of the embodiment of FIG. 1, the first, second, and third boot segments, 126, 127, and 132, respectively, are manufactured from semi-rigid non-elastomeric materials. Glass impregnated Nylon (polyamide) materials are also suitable for these boot segments because these materials have good resistance to rupturing, good resistance to high and low temperatures, and good grease resistance.

While the invention has been described in terms of its utility as a constant velocity drive joint for a front wheel drive automobile, it is also contemplated that it can be utilized in conjunction with universal joints that do not have constant velocity operating characteristics, in situations not requiring constant velocity operation, and that it can be used in conjunction with plunging universal joints in aircraft or other types of machines.

While a preferred and certain alternative embodiments of the present invention have been described, it will be apparent to those skilled in the art that changes may be made to the invention as described without departing from the spirit of the invention as defined in the appended claims. Accordingly, the description of this invention as heretofore set forth herein is intended to be illustrative of the principles of the invention and not to limit the scope thereof.

Although the best mode contemplated by the inventor for carrying out the present invention as of the filing date hereof has been shown as described herein, it will be apparent to those skilled in the art that suitable modifications, variations, and equivalents may be made without departing from the scope of the invention. This invention is to be limited solely by the terms of the claims appended hereto.

What is claimed is:

1. A boot for sealing a power transmitting mechanical joint of the plunging type, said joint comprising an inner joint member, an outer joint member, and means to transmit power from one of said joint members to the other of said joint members, said outer joint member having a cylindrical sealing surface, said boot comprising, in combination:

a boot segment formed from a non-flexible material, said boot segment having a cylindrical end portion which sealingly and slidingly surrounds said cylindrical sealing surface; and means extending from the other end of said boot segment and sealingly engaging said inner joint member to complete the seal of said mechanical joint.

2. The boot according to claim 1 and further comprising a slotted boot segment which sealingly surrounds said outer joint member, said slotted boot segment comprising a cylindrical slot therein, said cylindrical slot defining said cylindrical sealing surface of said outer joint member.

3. The boot according to claim 2 wherein said cylindrical surface portion is circular in cross-section.

4. The boot according to claim 2, wherein said means extending from said boot segment comprises another boot segment, said another boot segment being in sealing engagement with said boot segment and being capable of angular articulation with respect to said boot segment without breaking the seal therebetween.

5. The boot according to claim 4, wherein said boot segment has a non-cylindrical slot therein and wherein said another boot segment has an end portion which is complementally-shaped with respect to said non-cylindrical slot and which is slidingly and sealingly received in said non-cylindrical slot.

6. The boot according to claim 5, wherein said non-cylindrical slot has the shape of a portion of a sphere.

7. The boot according to claim 6, wherein said non-cylindrical slot extends radially inwardly from said second segment.

8. A power transmitting mechanical joint comprising:

an outer joint member having a cylindrical sealing surface;

an inner joint member spaced relative to said outer joint member;

one of said joint members being adapted to receive torque from a source of power and to transmit torque to a driven member through the other of said joint members;

said inner joint member and said outer joint member being subject to axial movement and to articulation relative to one another during the operation of said power transmitting mechanical joint; and a boot for sealing said power transmitting mechanical joint, said boot comprising a boot segment which is formed from a non-flexible material and which has a cylindrical portion that slidingly and sealingly surrounds said cylindrical sealing surface, and means extending from the other end of said boot segment and sealingly engaging said inner joint member to complete the seal of said mechanical joint.

9. The power transmitting mechanical joint according to claim 8 and further comprising a slotted boot segment which sealingly surrounds said outer joint member, said slotted boot segment comprising a cylindrical slot therein, said cylindrical slot defining said cylindrical sealing surface of said outer joint member.

10. The power transmitting mechanical joint according to claim 9 wherein the said cylindrical surface portion is circular in cross-section.

11. The power transmitting mechanical joint according to claim 8 in which said mechanical joint is a constant velocity drive joint.

12. The power transmitting mechanical joint according to claim 11 wherein said constant velocity drive joint is a front wheel drive joint for a front wheel drive automotive vehicle.

13. The power transmitting mechanical joint according to claim 12 wherein said front wheel drive joint has an input shaft and an output shaft and wherein said input shaft and said output shaft of said front wheel drive joint are subject to at least approximately twenty degrees articulation in each direction relative to one another during normal operation.

14. The power transmitting mechanical joint according to claim 13 wherein said boot segment has a non-cylindrical slot in its said other end and wherein said means extending from said other end of said boot segment is another boot segment, said another boot segment having an end portion which is complementally shaped with respect to said non-cylindrical slot and which is slidingly and sealingly received in said non-cylindrical slot, whereby said another boot segment can be articulated angularly with respect to said boot segment without loss of the seal therebetween.

15. The power transmitting mechanical joint according to claim 14 wherein said non-cylindrical slot has the shape of a portion of a sphere.

16. The power transmitting mechanical joint according to claim 14 wherein said non-cylindrical slot extends radially inwardly from said another segment.

17. The power transmitting mechanical joint according to claim 14, said power transmitting mechanical joint further comprising a lubricant contained therein, said lubricant being in contact with a portion of the inside surfaces of each of said boot segments, said slotted boot segment, and said another boot segment and serving to lubricate said boot segment for lubricated axial movement of said boot segment with respect to said slotted boot segment and for lubricated angular articulation between said another boot segment and said boot segment.

* * * * *

UNITED STATES PATENT AND TRADEMARK OFFICE
CERTIFICATE OF CORRECTION

PATENT NO. : 4,664,393

DATED : May 12, 1987

INVENTOR(S) : Daniel W. Hazebrook

It is certified that error appears in the above-identified patent and that said Letters Patent is hereby corrected as shown below:

Column 3, line 57, after "that" delete "the" second occurence.

Column 4, line 62, delete "first" and insert ---- second ----.

Same line, delete "26" and insert ---- 27 ----.

Column 6, line 17, after "has" delete "and".

Signed and Sealed this

Tenth Day of November, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,664,393

DATED : May 12, 1987

INVENTOR(S) : Daniel W. Hazebrook

It is certified that error appears in the above-identified patent and that said Letters Patent is hereby corrected as shown below:

Column 6, line 31, delete "first" and insert ---- second ----, same line, delete "126" and insert ---- 127 ----.

Figure 2, please extend the lead line for reference numeral 132 as indicated on the attached sheet.

Signed and Sealed this

Eighth Day of March, 1988

Attest:

DONALD J. QUIGG

Attesting Officer

Commissioner of Patents and Trademarks